(12) United States Patent
Sabin et al.

(10) Patent No.: US 11,089,402 B2
(45) Date of Patent: Aug. 10, 2021

(54) CONVERSATION ASSISTANCE AUDIO DEVICE CONTROL

(71) Applicant: Bose Corporation, Framingham, MA (US)

(72) Inventors: Andrew Todd Sabin, Chicago, IL (US); Jahn Dmitri Eichfeld, Natick, MA (US); Benjamin Davis Parker, Sudbury, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/165,071

(22) Filed: Oct. 19, 2018

(65) Prior Publication Data

US 2020/0128322 A1   Apr. 23, 2020

(51) Int. Cl.
| | |
|---|---|
| H04R 3/00 | (2006.01) |
| G06F 3/16 | (2006.01) |
| H04R 1/40 | (2006.01) |
| H04R 25/00 | (2006.01) |

(52) U.S. Cl.
CPC ............ *H04R 3/005* (2013.01); *G06F 3/165* (2013.01); *H04R 1/406* (2013.01); *H04R 25/552* (2013.01); *H04R 25/554* (2013.01); *H04R 25/558* (2013.01); *H04R 2201/401* (2013.01); *H04R 2225/43* (2013.01); *H04R 2430/23* (2013.01)

(58) Field of Classification Search
CPC ...... H04R 3/005; H04R 1/406; H04R 25/554; H04R 22/407; H04R 25/552; H04R 25/558; H04R 2201/401; H04R 2225/43; H04R 2430/23; G06F 3/165; H04B 2225/43; H04B 2430/23
See application file for complete search history.

(56) References Cited

U.S. PATENT DOCUMENTS

| | | | |
|---|---|---|---|
| 7,245,731 B2 * | 7/2007 | Niederdrank | H04R 25/558 381/23.1 |
| 9,131,321 B2 | 9/2015 | Sabin | |
| 9,560,451 B2 | 1/2017 | Eichfeld et al. | |
| 2002/0076072 A1 | 6/2002 | Cornelisse | |
| 2003/0112987 A1 | 6/2003 | Nordqvist et al. | |
| 2006/0126865 A1 | 6/2006 | Blamey et al. | |

(Continued)

FOREIGN PATENT DOCUMENTS

EP    3236673 A1    10/2017

OTHER PUBLICATIONS

Littmann etal, Speech Focus 360 degree in 10 Questions (Year: 2015).*

(Continued)

*Primary Examiner* — Matthew A Eason
*Assistant Examiner* — Kuassi A Ganmavo
(74) *Attorney, Agent, or Firm* — Hoffman Warnick LLC

(57) ABSTRACT

Various implementations include control mechanisms for conversation assistance audio devices. In some cases, an interface with a representation of the conversation assistance audio device in space is used to control audio functions in the device. In other cases, directionality of the device is controlled based upon the user's visual focus direction. In additional cases, the operating mode of the device is adjustable based upon the signature of a nearby acoustic signal.

17 Claims, 9 Drawing Sheets

(56) References Cited

U.S. PATENT DOCUMENTS

| | | | |
|---|---|---|---|
| 2006/0177079 A1* | 8/2006 | Baekgaard Jensen . | H04R 25/40 381/312 |
| 2007/0189544 A1 | 8/2007 | Rosenberg | |
| 2008/0144866 A1 | 6/2008 | Barthel et al. | |
| 2008/0165980 A1 | 7/2008 | Pavlovic et al. | |
| 2008/0253596 A1 | 10/2008 | Klinkby et al. | |
| 2009/0304187 A1 | 12/2009 | Dittberner | |
| 2010/0086156 A1* | 4/2010 | Rank | H04R 25/554 381/315 |
| 2011/0176697 A1 | 7/2011 | Apfel et al. | |
| 2012/0128187 A1* | 5/2012 | Yamada | H04R 25/407 381/313 |
| 2012/0163625 A1 | 6/2012 | Siotis et al. | |
| 2012/0182429 A1* | 7/2012 | Forutanpour | H04R 3/005 348/175 |
| 2012/0284619 A1* | 11/2012 | Myllyla | H04R 29/008 715/716 |
| 2013/0148829 A1* | 6/2013 | Lugger | H04R 25/00 381/312 |
| 2013/0195298 A1* | 8/2013 | Sacha | H04R 25/43 381/314 |
| 2013/0329923 A1* | 12/2013 | Bouse | H04R 25/40 381/313 |
| 2014/0198934 A1* | 7/2014 | Recker | H04R 25/402 381/313 |
| 2014/0294183 A1 | 10/2014 | Lee et al. | |
| 2014/0378083 A1 | 12/2014 | Kannappan et al. | |
| 2015/0023512 A1 | 1/2015 | Shennib | |
| 2015/0023534 A1 | 1/2015 | Shennib | |
| 2015/0049892 A1* | 2/2015 | Petersen | H04R 25/554 381/315 |
| 2015/0112672 A1 | 4/2015 | Giacobello et al. | |
| 2015/0170645 A1 | 6/2015 | Di Censo et al. | |
| 2015/0230036 A1* | 8/2015 | Pedersen | H04R 1/1041 381/330 |
| 2015/0289064 A1* | 10/2015 | Jensen | H04R 25/50 381/317 |
| 2015/0373465 A1* | 12/2015 | Strelcyk | H04R 25/40 381/313 |
| 2016/0080874 A1 | 3/2016 | Fullam | |
| 2016/0174001 A1 | 6/2016 | Ungstrup et al. | |
| 2016/0234609 A1* | 8/2016 | Bendsen | H04R 25/407 |
| 2017/0180882 A1* | 6/2017 | Lunner | H04R 25/505 |
| 2017/0221500 A1 | 8/2017 | Glasgow et al. | |
| 2017/0230760 A1 | 8/2017 | Sanger et al. | |
| 2019/0028817 A1* | 1/2019 | Gabai | H04N 5/23238 |
| 2020/0103513 A1* | 4/2020 | Knaappila | G01S 11/06 |

OTHER PUBLICATIONS

Siemens, Brochure Signia Carat (Year: 2014).*
"EasyTekApp. More convenience, more discretion, more functionality," https://www.bestsound-technology.co.uk/siemens-hearing-aids/wirless/ . . . , 2017, Sivantos Pte. Ltd. or its affiliates, 3 pages.
Invitation to Pay Additional Fees and, Where Applicable, Protest Fee, for International Application PCT/US2019/056492, dated Jan. 24, 2020, 14 pages.
Invitation to Pay Additional Fees and, Where Applicable, Protest Fee, for International Application PCT/US2019/056486, dated Feb. 3, 2020, 12 pages.
PCT International Search Report and Written Opinion for International Application No. PCT/US2019/056492, dated May 29, 2020, 20 pages.

* cited by examiner

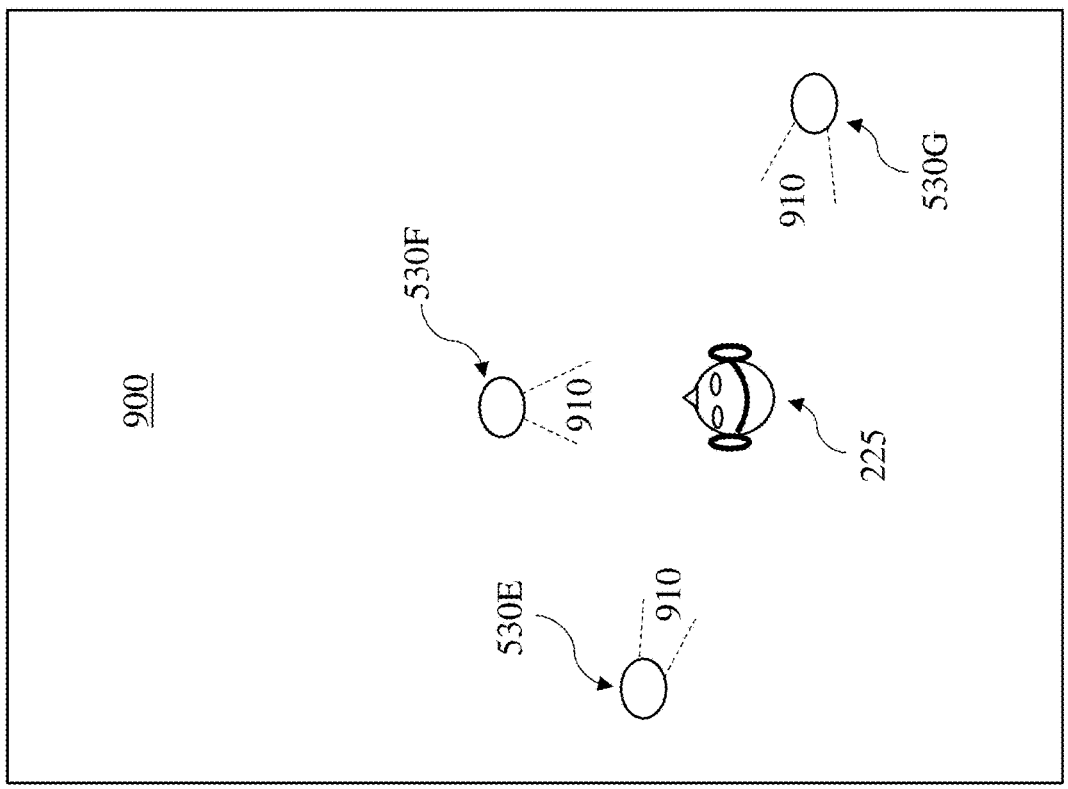

CONVERSATION ASSISTANCE AUDIO DEVICE CONTROL

TECHNICAL FIELD

This disclosure generally relates to audio devices. More particularly, the disclosure relates to controls for conversation assistance audio devices.

BACKGROUND

Conversation assistance devices aim to make conversations more intelligible and easier to understand. These devices aim to reduce unwanted background noise and reverberation. While these devices can significantly enhance the day-to-day experience of users with mild to moderate hearing impairment, it can be challenging to dynamically control these devices in changing environments.

SUMMARY

All examples and features mentioned below can be combined in any technically possible way.

Various implementations include control mechanisms for conversation assistance audio devices. In some cases, an interface with a representation of the conversation assistance audio device in space is used to control audio functions in the device. In other cases, directionality of the device is controlled based upon the user's visual focus direction. In still other cases, the operating mode of the device is adjustable based upon the signature of a nearby acoustic signal.

In some particular aspects, a computer-implemented method of controlling a conversation-assistance audio device worn by a user includes: providing an interface connected with the conversation-assistance audio device, the interface including a representation of a spatial arrangement of the conversation-assistance audio device in an environment; receiving a user command at the interface to modify an audio output at the conversation-assistance audio device; and adjusting a directionality of a microphone array located on the conversation-assistance audio device based upon the user command received at the interface, wherein adjusting the directionality of the microphone array comprises adjusting a main lobe angle of the microphone array.

In other particular aspects, a computer-implemented method of controlling a conversation-assistance audio device worn includes: receiving data indicating a direction in which the user is visually focused while wearing the conversation-assistance audio device; and adjusting a directionality of a microphone array on the conversation-assistance audio device to enhance acoustic signals received from the direction in which the user is visually focused based upon the received data.

In additional particular aspects, a computer-implemented method of controlling a conversation-assistance audio device includes: detecting an acoustic signal from a source proximate the conversation-assistance audio device, the detected acoustic signal having an acoustic signature indicating a characteristic of the source; comparing the acoustic signature of the detected acoustic signal with a library of acoustic signatures; and adjusting an operating mode of the conversation-assistance audio device in response to the acoustic signature of the detected acoustic signal matching an acoustic signature in the library of acoustic signatures.

Implementations may include one of the following features, or any combination thereof.

In certain implementations, the interface includes a tactile interface, and the user command received at the interface includes a tactile command.

In particular aspects, the interface is located on the conversation-assistance audio device.

In some cases, the interface is located on a screen on a computing device that is connected with the conversation-assistance audio device.

In certain aspects, an orientation of the interface is modified in response to movement of at least one of the computing device or the conversation-assistance audio device.

In some implementations, the directionality of the microphone array on the conversation-assistance audio device is adjustable by modifying the orientation of the interface or modifying an orientation of a depiction of the conversation-assistance audio device on the interface.

In particular cases, the representation of the spatial arrangement of the conversation-assistance audio device in the environment includes a visual representation of acoustic signal sources proximate the conversation-assistance audio device.

In some aspects, the acoustic signal sources are detected by the microphone array.

In certain implementations, the directionality of the microphone array on the conversation-assistance audio device is adjustable by selecting at least one of the acoustic signal sources or a direction of at least one of the acoustic signal sources relative to the conversation-assistance audio device on the interface.

In particular aspects, the representation of the spatial arrangement of the conversation-assistance audio device in the environment includes a visual representation of a space proximate the conversation-assistance audio device.

In some cases, the user command includes a focus command or a null command, and adjusting the directionality of the microphone array includes modifying a gain on the microphone array based upon the focus command or the null command.

In certain aspects, the data indicating the direction in which the user is visually focused includes orientation data received from a motion detection system on the conversation-assistance audio device.

In particular implementations, the motion detection system includes at least one of: an inertial measurement unit (IMU), an accelerometer or a gyroscope.

In some aspects, the orientation data indicates at least one of: a number of sources of acoustic signals proximate the user, or a range of movement of the user while wearing the conversation-assistance audio device.

In certain cases, the data indicating the direction in which the user is visually focused includes eye tracking data about movement of the eyes of the user received from a visual detection system on the conversation-assistance audio device.

In particular implementations, the data indicating the direction in which the user is visually focused includes at least one of visual tracking data about detected movement in an area proximate the user or visual tracking data about a range of movement of the user while wearing the conversation-assistance audio device.

In certain aspects, adjusting the directionality of the microphone array includes adjusting a main lobe angle of the microphone array.

In some cases, the operating mode is adjustable between a playback mode, a focused listening mode and a general listening mode.

In certain aspects, the acoustic signature of the detected acoustic signal indicates the source of the detected acoustic signal is a voice of the user, a voice of another user, a notification system or an alert system.

In some implementations, adjusting the operating mode of the conversation-assistance audio device includes modifying a directionality of a microphone array at the conversation-assistance audio device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

FIG. 9 is an additional example of a user in an environment, illustrating functions in a conversation assistance audio engine according to various implementations.

Figure 1:
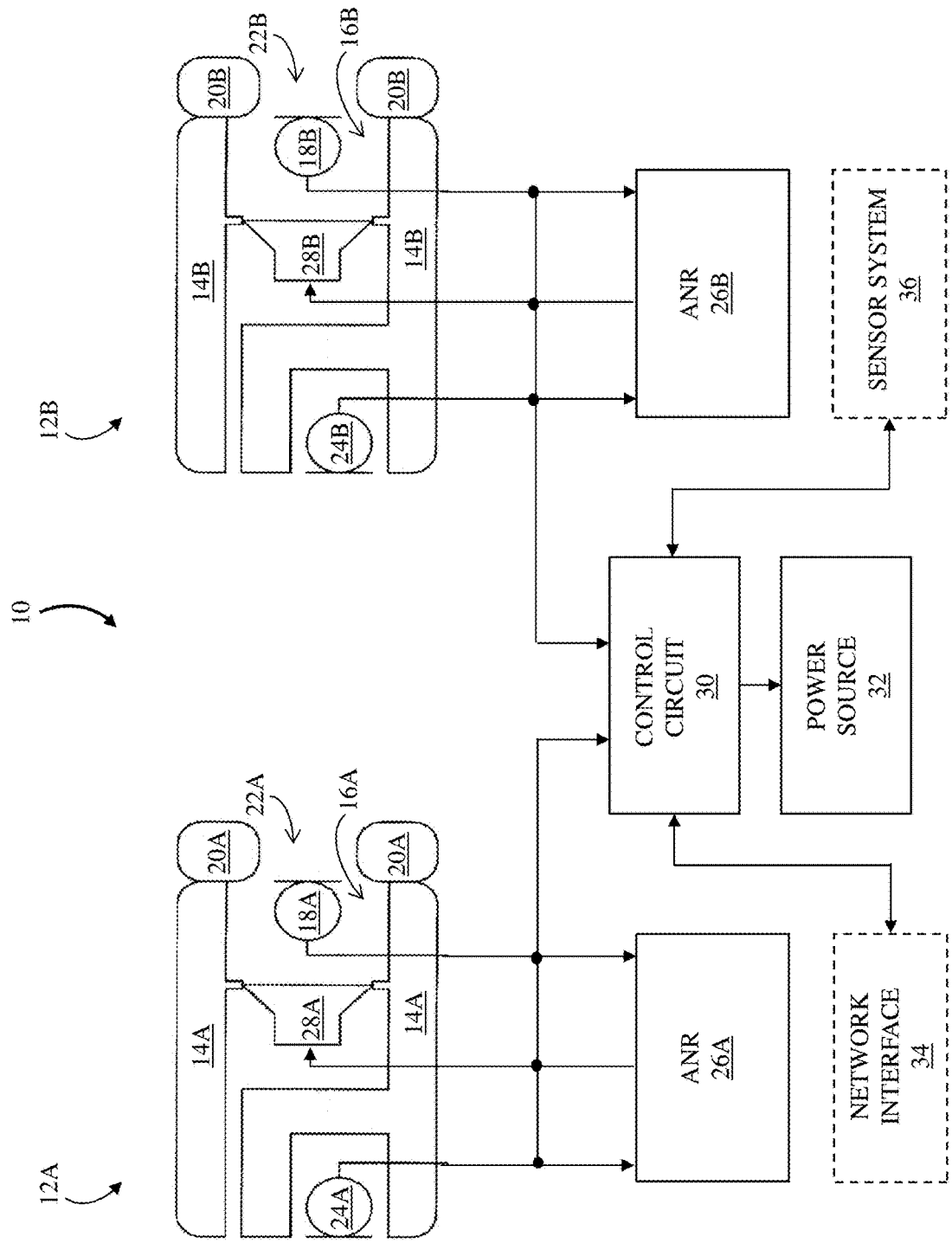
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that settings in a conversation assistance audio system can be beneficially adjusted based upon user interface commands, the user's visual focus direction and/or characteristics of detected ambient acoustic signals. For example, an interface with a representation of the conversation assistance audio device in space can be used to control audio functions in the device. In other cases, directionality of the device can be controlled based upon the user's visual focus direction. In still other cases, the operating mode of the device is adjustable based upon the signature of a nearby acoustic signal.

Commonly labeled components in the FIGURES are considered to be substantially equivalent components for the purposes of illustration, and redundant discussion of those components is omitted for clarity.

Conventional hearing assistance devices (or, hearing aids) are typically tested and adjusted by an audiology professional such as an audiologist in one or more appointments with the user. Interacting with a professional on an in-person basis can give the user confidence in the setup process, and can provide opportunities for refinement of device settings as conditions change or evolve.

However, a portion of the population can benefit from devices that enhance conversation and other select ambient acoustic signals, but may not wish to use a hearing assistance device and/or seek professional medical help. For many of these people, conversation assistance devices provide an attractive compromise between a hearing aid and receiving no hearing assistance. Despite the benefits of these conventional conversation assistance devices, it can be challenging to personalize the user experience without seeking professional medical help. Examples of conventional conversation assistance devices are described in U.S. Pat. No. 9,560,451 ("Conversation Assistance System"), which is incorporated by reference here in its entirety.

In contrast to conventional conversation assistance devices, various implementations include conversation assistance devices configured for a user with a software module or mobile application that permits the user to adjust the device without needing to consult an audiologist or other hearing assistance professional. The approaches described according to some implementations present a user with a navigable interface including a spatial arrangement of the conversation assistance audio device in an environment. The user can adjust the directionality of the device's microphone array using this interface. In still other implementations, the directionality of the microphone array is adjustable based upon the user's detected focus direction. Additional approaches include adjusting an operating mode of the device in response to an acoustic signature of a detected signal proximate the device matching a library signature.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, ANR can be combined with other audio functions in headphones, such as conversation enhancing functions, for example, as described in U.S. Pat. No. 9,560,451. While the term ANR is used to refer to acoustic output of anti-noise sounds, this term can also include controllable noise canceling (CNC), which permits control of the level of anti-noise output, for example, by a user. In some examples, CNC can permit a user to control the volume of audio output regardless of the ambient acoustic volume.

Aspects and implementations disclosed herein may be applicable to a wide variety of personal audio devices, such as wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 (e.g., a conversation assistance audio device) having two earpieces 12A and 12B, each configured to direct sound towards an ear of a user. Features of the personal audio device 10 can be particularly useful as a wearable audio device, e.g., a head and/or shoulder-worn conversation assistance device. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR (which may include CNC), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for an audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. In various particular implementations, the outer microphones 24 can include an array of microphones with adjustable directionality for dynamically modifying the "listening direction" of the personal audio device 10.

The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling conversation assistance functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling conversation assistance functions, as well as digital signal processing and equalization. Additional details may be found in U.S. Patent Application Publication 20140277644, U.S. Patent Application Publication 20170098466, and U.S. Patent Application Publication 20140277639, the disclosures of which are incorporated here by reference in their entirety.

Personal audio device 10 can also include a sensor system 36 coupled with control circuit 30 for detecting one or more conditions of the environment proximate personal audio device 10. Sensor system 36 can include one or more local sensors (e.g., inner microphones 18 and/or outer microphones 24) and/or remote or otherwise wireless (or hardwired) sensors for detecting conditions of the environment proximate personal audio device 10 as described herein. As described further herein, sensor system 36 can include a plurality of distinct sensor types for detecting conditions proximate the personal audio device 10. In certain cases, the sensor system 36 can include a microphone array similar to outer microphones 24, or in addition to outer microphones 24 for modifying the listening direction of the personal audio device 10.

Any microphone described herein as being capable of adjusting directionality can include a plurality of microphones, which may each include a conventional receiver for receiving audio signals (e.g., audio input signals). In some cases, these microphones can include one or more directional microphones. However, in other cases, each microphone in an array can include an omnidirectional microphone configured to be directed by a digital signal processor (DSP), which can be part of control circuit 30. A DSP can be coupled with the microphones (and in some cases, the network interface 34) and include one or more DSP filters for processing audio input and/or audio output in order to control the direction of the microphone array, e.g., by DSP beamforming. DSP beamforming is a known technique for summing the input (e.g., audio input) from multiple directions to achieve a narrower response to input(s) from a particular direction (e.g., left, right, straight ahead, etc.). In some cases the microphone array can include a curved microphone array including a plurality of microphones arranged along an arcuate path, however, in other cases the microphone array can include a linearly arranged set of microphones.

According to various implementations, the conversation assistance devices (which may be, for example, personal audio device 10 of FIG. 1) described herein can be configured to dynamically adjust the microphone array direction based upon user and/or sensor inputs. These particular implementations can allow a user to experience dynamic, personalized conversation assistance throughout differing acoustic environments. These implementations can enhance the user experience in comparison to conventional conversation assistance systems.

Figure 2:
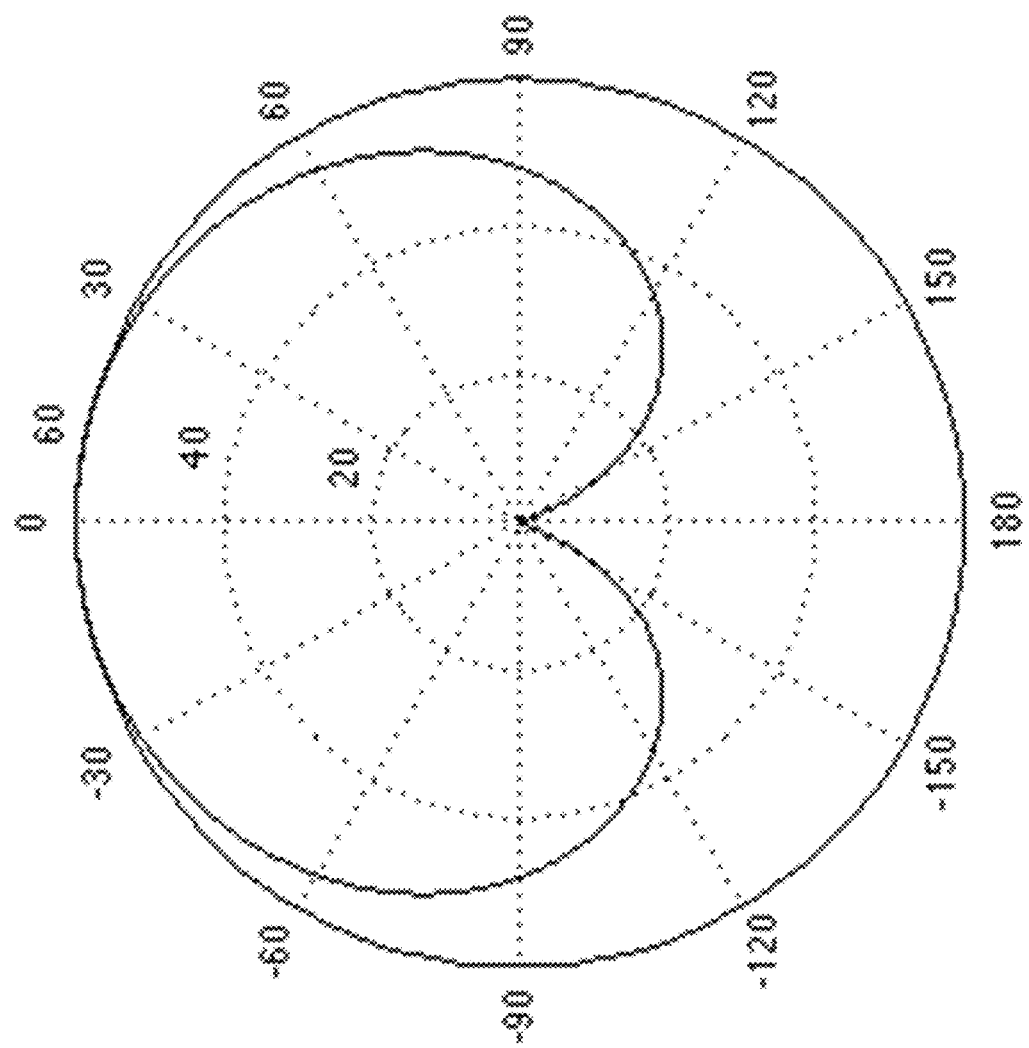
FIG. 2 is a polar graphical depiction illustrating an example response from a given environment at microphones without beamforming.
Figure 3:
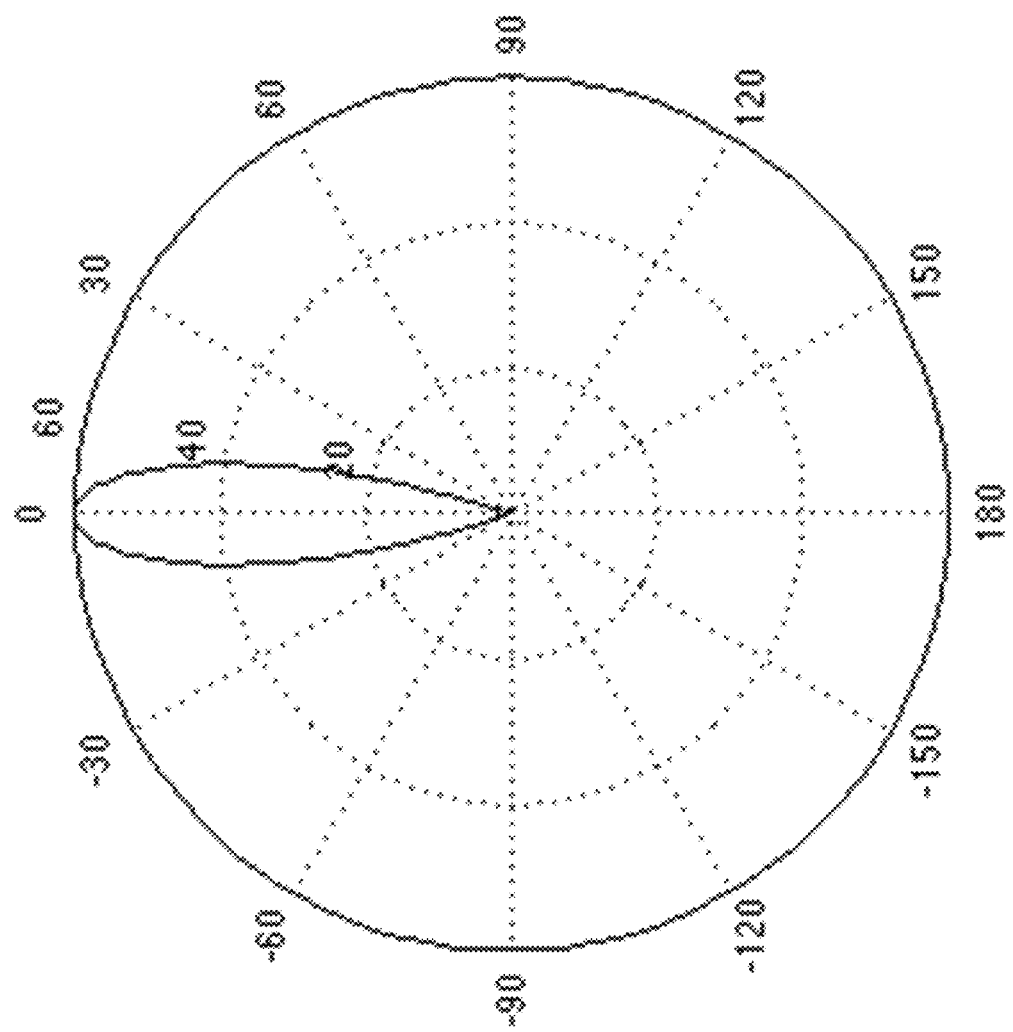
FIG. 3 illustrates a filtered response at microphones from FIG. 2 with digital signal processing (DSP) filters applied to direct a microphone array in a particular direction.

An example response from a given environment (without beamforming) at microphones (e.g., microphones 24, FIG. 1) is shown in the polar graphical depiction of FIG. 2, where the desired pointing direction is called the maximum response angle (MRA), the angle in the polar graph of FIG. 2 is the off-set from that MRA, and the radius is the amplitude response in that MRA direction. FIG. 3 illustrates a filtered response at microphones with DSP filters applied to direct the microphone array in a particular direction (e.g., the MRA direction, which can be dictated by a user command, a direction in which the user is visually focused, a nearby acoustic signal matching a stored acoustic signature, etc.).

In various implementations, the control circuit 30 (FIG. 1) can adjust microphone array directionality, e.g., based upon particular user commands. In particular cases, adjusting the directionality of a microphone array (e.g., microphones 24, FIG. 1) includes adjusting a main lobe angle of the microphone array. The main lobe (or main beam) is the peak point of the array's directivity, and the main lobe angle is the angle of orientation of that peak point relative to the array. In contrast to some conventional systems that adjust the width of array's beam pattern, the control circuit 30 is configured to adjust the main lobe angle of the array in response to user commands.

Figure 4:
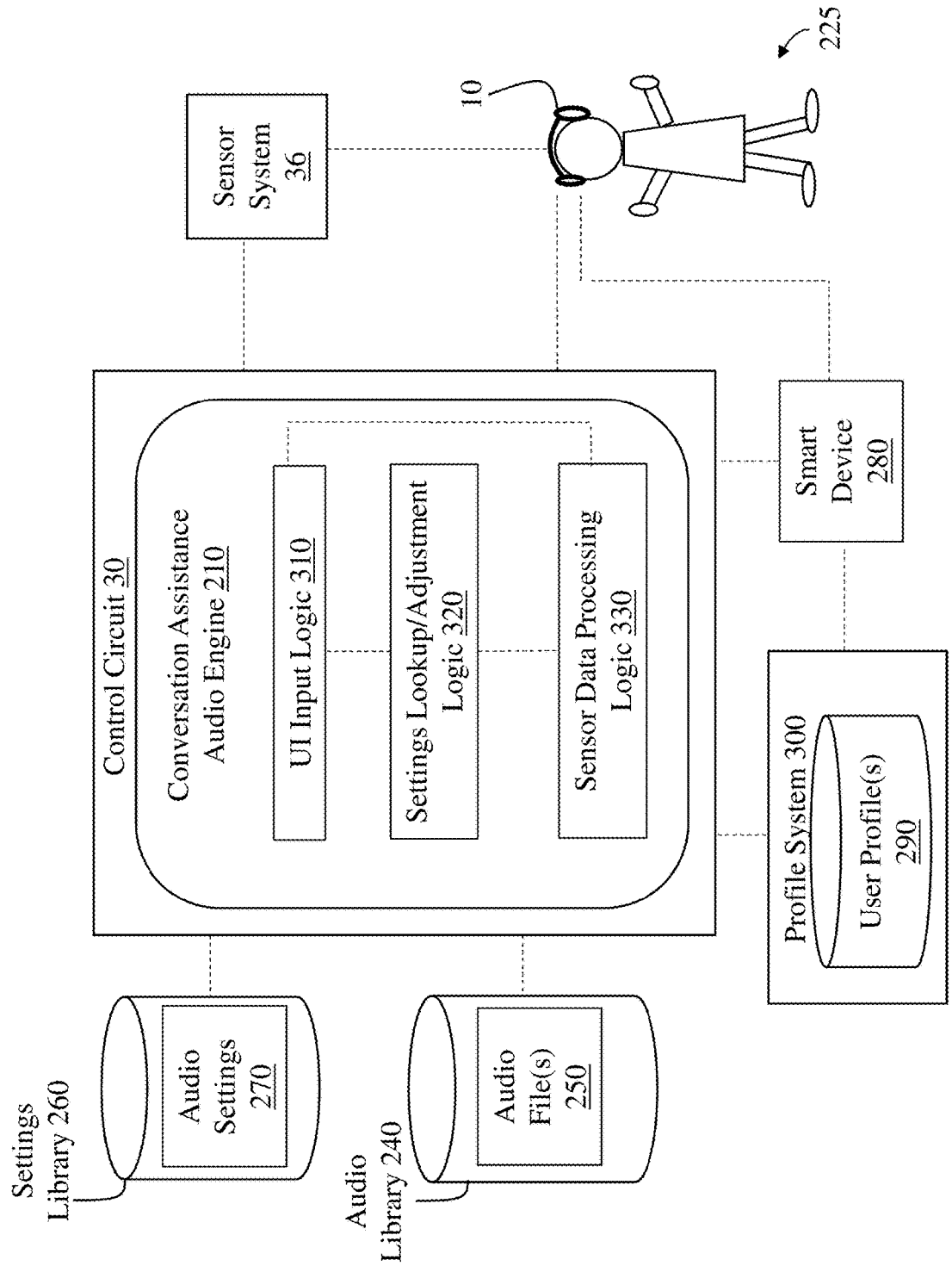
FIG. 4 shows a schematic data flow diagram illustrating control processes performed by a conversation assistance audio engine in the personal audio device of FIG. 1.

As described with respect to FIG. 1, control circuit 30 can execute (and in some cases store) instructions for controlling audio functions in personal audio device 10 and/or a smart device coupled with the personal audio device 10 (e.g., in a network). As shown in FIG. 4, control circuit 30 can include a conversation assistance audio engine 210 configured to implement modifications in audio settings (e.g., settings in ANR circuits 26A,B, FIG. 1) for outputs at the transducer (e.g., speaker) 28 (FIG. 1) based upon user and/or sensor inputs. Additionally, one or more portions of the conversation assistance audio engine 210 (e.g., software code and/or logic infrastructure) can be stored on or otherwise accessible to a smart device 280, which may be connected with the control circuit 30 by any communications connection described herein. As described herein, particular functions of the conversation assistance audio engine 210 can be beneficially employed on the smart device 280.

With continuing reference to FIG. 4, data flows between conversation assistance audio engine 210 and other components in personal audio device 10 are shown. It is understood that one or more components shown in the data flow diagram may be integrated in the same physical housing, e.g., in the housing of personal audio device 10, or may reside in one or more separate physical locations.

As noted herein, conversation assistance audio engine 210 can be coupled (e.g., wirelessly and/or via hardwired connections in personal audio device 10) with an audio library 240, which can include audio files 250. In some cases, audio files 250 include files for playback (e.g., streaming) at personal audio device 10, and/or stored audio signatures of acoustic signals. Audio library 240 can be associated with digital audio sources accessible via network interface 34 (FIG. 1) described herein, including locally stored, remotely stored or Internet-based audio libraries.

Conversation assistance audio engine 210 can also be coupled with a settings library 260 for controlling audio setting(s) on the personal audio device 10. The settings library 260 can include a group of audio settings 270 for applying different modifications to incoming acoustic signals received at the personal audio device 10. As described herein, the settings 270 can be adjusted based upon user inputs and/or sensor inputs about the environment proximate the personal audio device 10. In certain cases, adjusting the audio settings 270 in the personal audio device can include adjusting one or more of: a directivity of a microphone array in the personal audio device 10, a microphone array filter on the microphone array in the personal audio device 10, a volume of audio provided to the user 225 at the personal audio device 10, parameters controlling wide dynamic range compression or gain parameters controlling the shape of the frequency versus gain function.

As noted herein, conversation assistance audio engine 210 can also be coupled with the smart device 280 that has access to one or more user profiles 290 (e.g., in a profile system 300) or biometric information about user 225. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with user 225, and can include one or more network interfaces for interacting with control circuit 30 and other components in personal audio device 10 (FIG. 1).

In some example implementations, smart device 280 can be utilized for: connecting personal audio device 10 to a Wi-Fi network; creating a system account for the user 225; setting up music and/or location-based audio services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases smart device 280 may also be used for: music services setup; browsing of content; setting preset assignments on the audio playback devices; transport control of the audio playback devices; and selecting personal audio devices 10 (or other playback devices) for content playback. Smart device 280 can further include embedded sensors for measuring biometric information about user 225, e.g., travel, sleep or exercise patterns; body temperature; heart rate; or pace of gait (e.g., via accelerometer(s)). As noted herein, smart device 280 can be used to provide interface options to the user 225 and/or gather data about acoustic conditions proximate the user 225. Further, it is understood that one or more functions of the conversation assistance audio engine 210 can be stored, accessed and/or executed at smart device 280.

User profiles 290 may be user-specific, community-specific, device-specific, location-specific or otherwise associated with a particular entity such as user 225. User profiles 290 can include user-defined playlists of digital music files, audio messages stored by the user 225 or another user, or other audio files available from network audio sources coupled with network interface 34 (FIG. 1), such as network-attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the audio personal audio device 10 over a wide area network such as the Internet. In some cases, profile system 300 is located in a local server or a cloud-based server, similar to any such server described herein. User profile 290 may include information about audio settings associated with user 225 or other similar users (e.g., those with common hearing attributes or demographic traits), frequency with which particular audio settings are changed by user 225 or other similar users, etc. Profile system 300 can be associated with any community of users, e.g., a social network, subscription-based music service, and may include audio preferences, histories, etc. for user 225 as well as a plurality of other users. In particular implementations, profile system 300 can include user-specific preferences (as profiles 290) for audio settings 270. Profiles 290 can be customized according to particular user preferences, or can be shared by users with common attributes.

Conversation assistance audio engine 210 is also configured to receive sensor data from sensor system 36. Additionally, as noted herein, the conversation assistance audio engine 210 can receive sensor data from the smart device 280. This sensor data can be used to control various functions such as ANR (and CNC) functions, dynamic volume control, notifications, etc. In some cases, sensor system 36 can include one or more of the following sensors: a position tracking system; an accelerometer/gyroscope; a microphone (e.g., including one or more microphones, which may include or work in concert with microphones 18 and/or 24); and a wireless transceiver. These sensors are merely examples of sensor types that may be employed according to various implementations. It is further understood that sensor system 36 can deploy these sensors in distinct locations and distinct sub-components in order to detect particular environmental information relevant to user 225 and the personal audio device 10.

A position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. The position tracking system can be configured to detect changes in the physical location of the personal audio device 10 and/or user 225 (where user 225 is separated from personal audio device 10) and provide updated sensor data to the conversation assistance audio engine 210. The position tracking system can also be configured to detect the orientation of the user 225, e.g., a direction of the user's head, or a change in the user's orientation such as a turning of the torso or an about-face movement.

An accelerometer/gyroscope can include distinct accelerometer components and gyroscope components, or could be collectively housed in a single sensor component, e.g., an inertial measurement unit (IMU). This component may be used to sense gestures based on movement of the user's body (e.g., head, torso, limbs) while the user is wearing the personal audio device 10 or interacting with another device (e.g., smart device 280) connected with personal audio device 10. As with any sensor in sensor system 36, the accelerometer/gyroscope may be housed within personal audio device 10 or in another device connected to the personal audio device 10.

The microphone (which can include one or more microphones, or a microphone array) can have similar functionality as the microphone(s) 18 and 24 shown and described with respect to FIG. 1, and may be housed within personal audio device 10 or in another device connected to the personal audio device 10. As noted herein, microphone(s) may include or otherwise utilize microphones 18 and 24 to perform functions described herein. Microphone(s) can be positioned to receive ambient acoustic signals (e.g., acoustic signals proximate personal audio device 10). In some cases, these ambient acoustic signals include speech/voice input from user 225 to enable voice control functionality. In some other example implementations, the microphone can detect the voice of user 225 and/or of other users proximate to or interacting with user 225. In particular implementations, conversation assistance audio engine 210 is configured to analyze one or more voice commands from user 225 (via microphone), and modify the applied audio settings 270 on the personal audio device 10. In some cases, the conversation assistance audio engine 210 can include sensor data processing logic for analyzing voice commands, including, e.g., natural language processing (NLP) logic or other similar logic, as well logic for analyzing other sensor inputs, as described herein.

As noted herein, the sensor system 36 can also include a wireless transceiver (comprising a transmitter and a receiver), which may include, a Bluetooth (BT) or Bluetooth Low Energy (BTLE) transceiver or other conventional transceiver device. The wireless transceiver can be configured to communicate with other transceiver devices in distinct components (e.g., smart device 280).

It is understood that any number of additional sensors can be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

According to various implementations, the control circuit 30 includes the conversation assistance audio engine 210, or otherwise accesses program code for executing processes performed by conversation assistance audio engine 210 (e.g., via network interface 34). Conversation assistance audio engine 210 can include logic for processing user interface (UI) inputs from the user 225. Additionally, conversation assistance audio engine 210 can include logic for looking up and adjusting audio settings according to UI inputs and known characteristics of the acoustic environment (e.g., as detected by the sensor system 36). The conversation assistance audio engine 210 can also include logic for processing sensor data from the sensor system 36, e.g., data about ambient acoustic signals from microphones, data about a location of the personal audio device 10, biometric data from a smart device, and/or usage data from a smart device. As noted herein, conversation assistance audio engine 210 can include logic for performing audio control functions according to various implementations.

According to various implementations, the personal audio device 10 has a predefined set of audio settings 270. In certain cases, these predefined settings 270 are default settings for the personal audio device 10, e.g., standard settings designed to function most effectively for the population of potential users of personal audio device 10 and similar devices. In other cases, the predefined settings are saved in the personal audio device 10 based upon prior usage, e.g., if the user 225 or another prior user of the personal audio device 10 has already defined settings for the device. In still other cases, the predefined settings are based upon one or more user profile(s) 290, which can be attributed to the user 225 and/or to other users. In certain cases, the profile-based settings can be defined by settings selected or positively verified by a plurality of users in a community or network.

In various particular implementations, the conversation assistance audio engine 210 can be configured to provide an interface connected with the personal audio device 10, e.g., located on the personal audio device 10 or on another computing device such as the smart device 280. In various implementations, the interface allows the user 225 to control the directionality of the microphone array in the personal audio device 10 to enhance conversation assistance functions.

Figure 5:
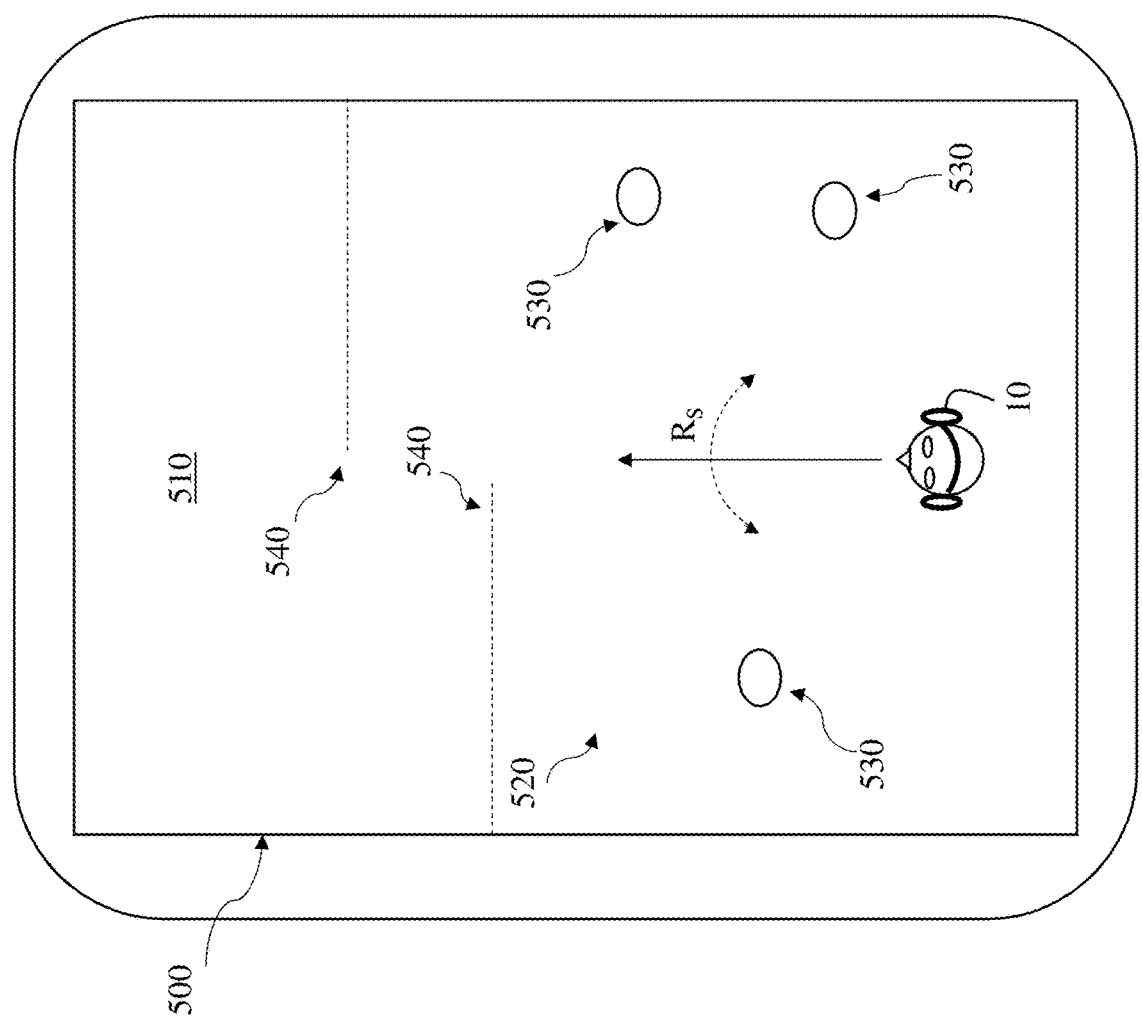
FIG. 5 shows an example of a user interface according to various implementations.

FIG. 5 shows an example of an interface 500 according to various implementations. In this example implementation, the interface 500 can include a representation of a spatial arrangement of the personal audio device 10 in an environment 510. In some cases, the representation can show the personal audio device 10 within a space 520 proximate the personal audio device 10. In some cases, this space 520 is defined by a radius, such as a defined distance ($R_S$) from the personal audio device 10 in one or more directions. In other cases, this space 520 is defined by proximity to acoustic signal sources 530, e.g., as detected by microphones in the sensor system 36. These acoustic signal sources 530 can define the perimeter of the space 520 in some implementations. In other implementations, the space 520 is defined by a known physical perimeter 540, e.g., as detected by proximity sensors in the sensor system 36. The proximity sensors in this case could use optical, sound-based and/or communications-system based techniques to identify a physical perimeter, e.g., a Wi-Fi router, a wall, or a doorway.

In some cases, the interface 500 (and other interfaces described herein) can include a tactile interface capable of receiving tactile commands from the user 225 for performing functions described herein. For example, the interface 500 can include a touch screen, capacitive touch interface or other touch-based interface capable of receiving commands from the user 225 to perform interface functions.

In particular implementations, the interface 500 presents the user 225 with options to modify the audio output at the personal audio device 10. For example, in various implementations, the user 225 can provide a command via the interface 500 to change the focus direction of the personal audio device 10 either toward a particular acoustic signal source 530 or away from a particular acoustic signal source 530.

Figure 6:
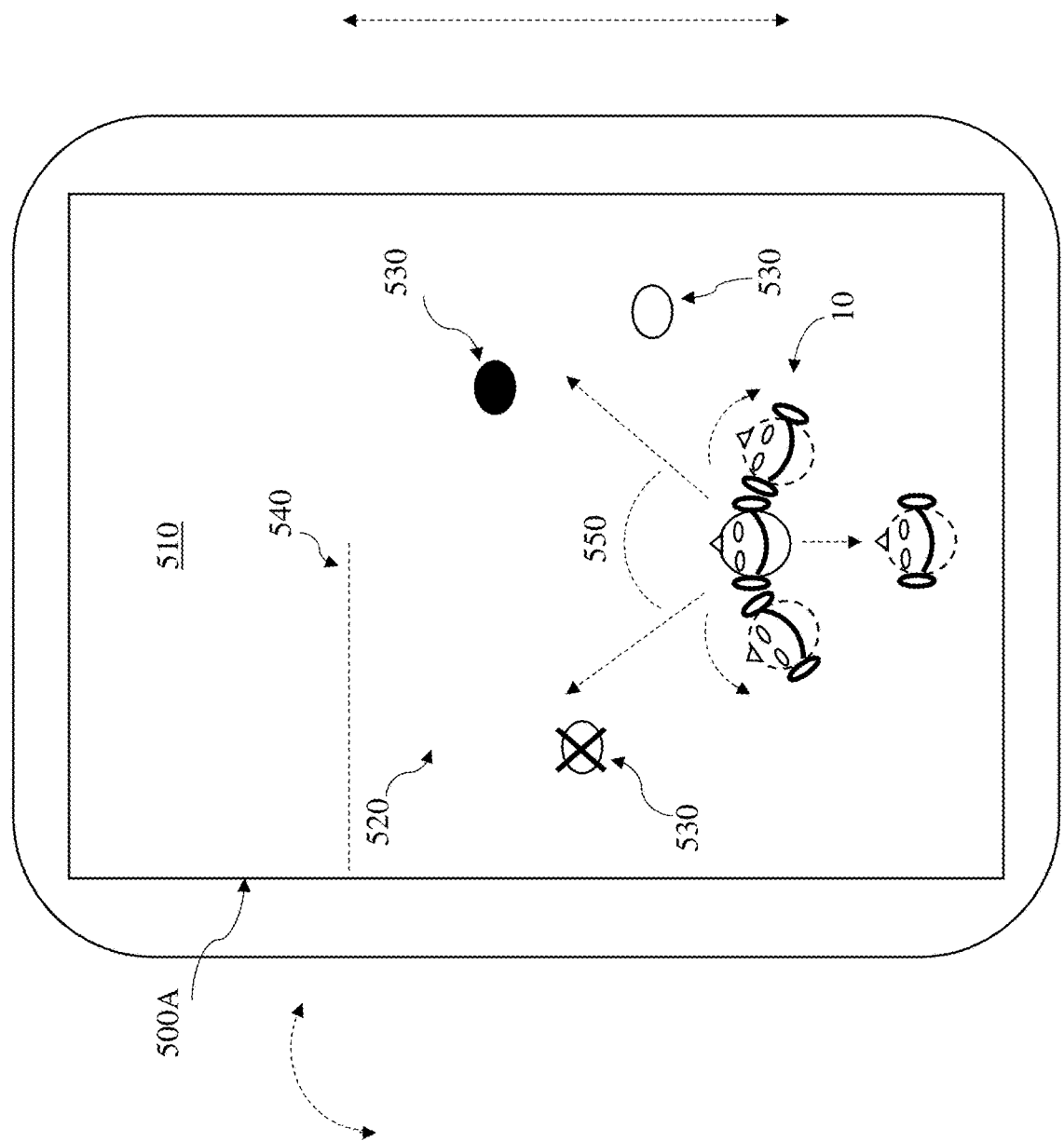
FIG. 6 shows an example of a user interface according to various additional implementations.

FIG. 6 shows a specific implementation of an interface 500A, which depicts acoustic signal sources 530 in the space 520 proximate the personal audio device 10. The user 225 can view this interface 500A, e.g., on the personal audio device 10 or the smart device 280, and provide commands to modify the conversation assistance functions of the personal audio device 10. In this example interface 500A, the personal audio device 10 is depicted in space 520, with several acoustic signal sources 530 nearby. These acoustic signal sources 530 can include human speakers (e.g., one or more people speaking with the user 225 or one another), audio systems (e.g., audio/video entertainment systems playing music or voice content), noise sources (e.g., an appliance or window open to outdoor noise), etc. While acoustic signal sources 530 can represent inactive sources of acoustic signals (e.g., a dormant media player), in some particular cases, only sources of active acoustic signals are depicted in the interface 500A. Further, acoustic signal sources 530 can be dynamically added/subtracted from the interface 500A based upon activity level. In various particular implementations, the acoustic signal sources 530 are detected by the microphone array on the personal audio device 10, however, in some cases, one or more microphones in the smart device 280 can detect and/or verify the presence of acoustic signal sources 530.

With continuing reference to FIGS. 5 and 6, and particular reference to FIG. 6, the conversation assistance audio engine 210 is configured to receive a user command at the interface 500A to modify the audio output at the personal audio device 10. Based upon this user command, the conversation assistance audio engine 210 is configured to adjust the directionality of the microphone array on the personal audio device 10. Various user commands can aid in adjusting the conversation assistance functions of the personal audio device 10. For example, the user 225 can modify the orientation of the interface (e.g., interface 500A) by moving the personal audio device 10 and/or the smart device 280 (shown with phantom arrows). In some cases, this can help to keep the interface 500A aligned with the direction that the user 225 is facing. Location detecting sensors in the sensor system 36 can provide sensor data to the conversation assistance audio engine 210, which in turn can adjust the orientation of the personal audio device 10 in space 520 on the interface 500A. In some particular cases, the personal audio device 10 and/or the smart device 280 can detect that the user 225 is rotating in a direction, and rotate the orientation of the space 520 on the interface 500A accordingly.

In some cases, the conversation assistance audio engine 210 is configured to modify the directionality of the microphone array on the personal audio device 10 with the adjustment of the interface orientation. That is, these implementations allow the user 225 to change microphone array directionality by simply changing the orientation of the interface 500A on the personal audio device 10. As noted herein, the orientation can be modified by movement of the personal audio device 10 and/or the smart device 280. In these cases, the user 225 can move (e.g., rotate) the personal audio device 10 or simply look in a different direction (e.g., turn head right or left) to modify the microphone array directionality. That is, the sensor system 36 can detect movement of the personal audio device 10 and/or the smart device 280 and adjust a focus direction of the microphone array based upon an inferred orientation of the user 225.

In still other cases, the user 225 can control the directionality of the microphone array by modifying the orientation of the depiction of the personal audio device 10 on the interface 500A. For example, looking at FIG. 6, the user 225 can modify the orientation of the personal audio device 10 in space 520 in order to change the focus direction of the microphone array. In certain cases, the user 225 can use a touch-and-drag or grab-and-rotate command on a touch screen to change the orientation of the depiction of the personal audio device 10 in space 520. Rotation commands and a translation command are illustrated in phantom. In other cases, the focus range of the microphone array can be modified, e.g., using a command on the interface 500A. In these cases, a focus range 550 is shown extending from the depiction of the personal audio device 10 in space 520. The user 225 can narrow or widen that focus range 550, e.g., using a touch-and-drag or grab-and-rotate command.

In still other implementations, the user 225 can adjust the directionality of the microphone array by selecting one or more acoustic signal sources 530 or a direction of one of the acoustic signal sources 530 relative to the personal audio device 10 as depicted on the interface 500A. For example, as shown in FIG. 6, the user 225 can select (e.g., touch) an acoustic signal source 530 (depicted as filled oval) on the interface 500A to focus the microphone array in the direction of that acoustic signal source 530. In other cases, the user 225 can select (e.g., touch, drag, swipe) the interface 500A at a location that indicates a desired direction of focus for the microphone array. This can be useful for focusing the microphone array on a region of the space surrounding the user 225, such as where more than one acoustic signal source 530 is of interest within the same region.

Focus commands are described herein, and can be actuated using a variety of actuation mechanisms. For example, to focus on a particular acoustic signal source 530 or direction, the user 225 can tap, double-tap, tap-and-hold, or perform another designated tactile-based command to focus the microphone array in a particular direction (or toward a particular source). The interface (e.g., interface 500A) can also be configured to receive null commands from the user 225 to block acoustic signals from particular areas proximate the user 225 or particular acoustic signal sources 530.

In these cases, the user 225 can make similar commands to focus commands (e.g., relative to particular acoustic signal sources 530 and/or directions), but may actuate those commands in a slightly different manner. For example, a single tap on interface 500A could actuate a focus command, while a double tap or a tap-and-hold gesture could actuate a null command (shown with an "X" indicator in FIG. 6). In response to focus or null commands, the conversation assistance audio engine 210 can modify a gain on the microphone array at the personal audio device 10 to adjust the audio output at that device 10.

In some cases, the sensor system 36 can be used to verify or control these interface commands. For example, a user 225 can tap on a particular acoustic signal source 530 on the interface 500A to preliminarily select an array direction or block an array direction, and to verify that selection, can tap on an interface (e.g., a capacitive touch interface) on the personal audio device 10. In other cases, the user 225 can receive audio prompts or additional instructions (via the transducers on the personal audio device 10) to verify a selection made on the interface 500A. For example, a user 225 can make a null selection to block an acoustic signal source 530, and the conversation assistance audio engine 210 can respond to that command with a prompt at the personal audio device 10 asking for verification (e.g., "please nod or double-tap your earbuds to verify you would like to block speaker X").

As noted herein, the conversation assistance audio engine 210 is configured to adjust a directionality of the microphone array in the personal audio device 10 according to user input, as well as inputs from the sensor system 36. In some particular cases, the conversation assistance audio engine 210 is configured to receive data indicating a direction in which the use 225 is visually focused while wearing the personal audio device 10, and adjust the directionality of the microphone array to enhance acoustic signals received from the direction in which the user is visually focused. That is, the conversation assistance audio engine 210 can adjust the focus direction of the microphone array at the personal audio device 10 to correspond with the user's visual focus direction.

In practice, the conversation assistance audio engine 210 receives sensor data from the sensor system 36 in order to determine the user's visual focus direction. While in some cases the personal audio device 10 can include a wearable audio device such as headphones, earphones, or wearable glasses, in other cases, the personal audio device 10 can include neck-worn or body-worn speakers. As such, the data used to detect the user's visual focus direction can vary based upon the configuration of the personal audio device 10.

Figure 7:
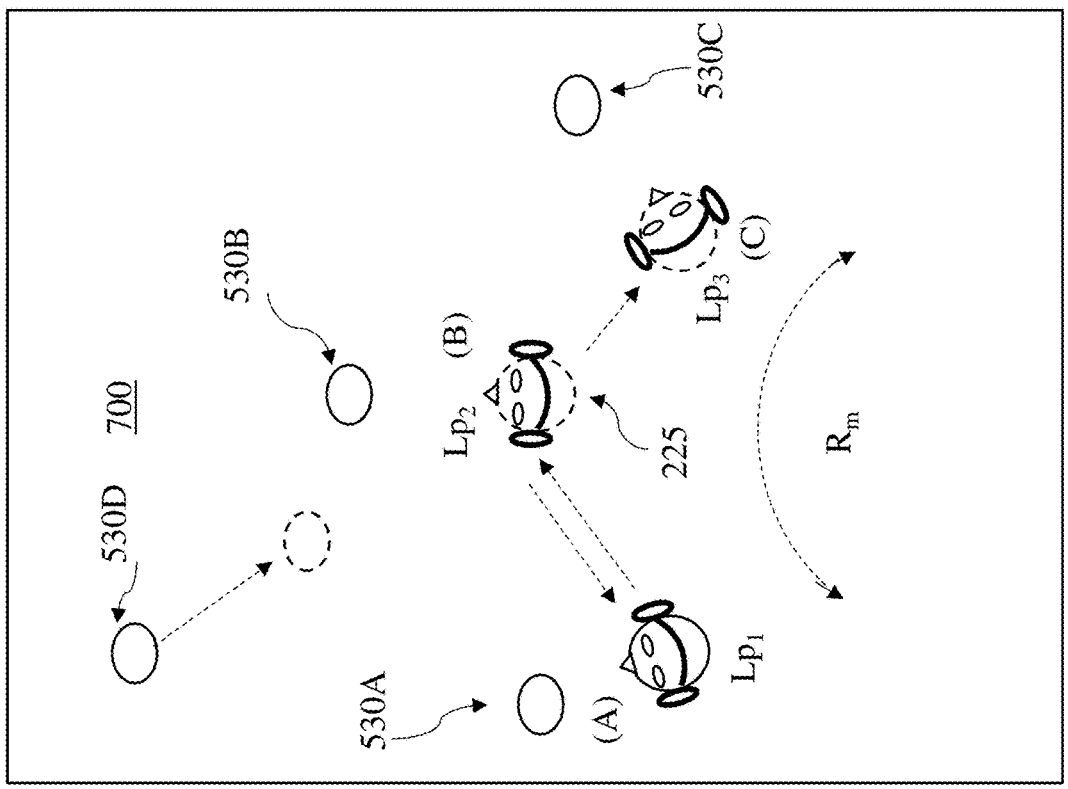
FIG. 7 shows an example of a user in an environment, illustrating functions in a conversation assistance audio engine according to various implementations.

In particular cases, the conversation assistance audio engine 210 receives orientation data from a motion detection system in the sensor system 36, on a periodic or continuous basis, and adjusts the microphone array directionality to focus on the direction in which the user 225 is focused (i.e., looking). In certain cases, the motion detection system includes an inertial measurement unit (IMU), an accelerometer and/or a gyroscope. In these cases, the motion detection system can provide an indication that the user 225 has changed position and/or orientation, e.g., by turning his/her head a certain number of degrees, or stepping forward or backward in an environment. Example motions are illustrated in the schematic depiction of an environment 700 in FIG. 7. In response to receiving orientation data indicating a change in the user's visual focus direction, the conversation assistance audio engine 210 is configured to compare that movement (e.g., degrees of rotation, and/or distance moved in a particular direction) with a threshold to determine whether the focus direction of the microphone array should be modified. In certain cases, small movements (e.g., several degrees of rotation) may not exceed a threshold to trigger adjustment of the microphone array directionality. For example, a threshold for degrees of rotation can be equal to approximately 45 degrees, which is the angle the head would turn to look at a talker seated next to a frontal talker, e.g., across a table. Additionally, a timer or timing threshold can be used to indicate that the change in head position is deliberate, e.g., that the new head position is a position of interest and not simply a passing glance. The conversation assistance audio engine 210 may not take action based upon an orientation change unless the rotation threshold and the timing threshold are both satisfied. In additional cases, the direction associated with the orientation change is confirmed using sensor data about an acoustic source in that direction. For example, sensor data from the microphones can confirm a talker of interest in a direction of the orientation change, and can be used as an additional criteria for taking orientation-related action (e.g., action not taken until rotation threshold is met, timing threshold is met and/or acoustic source is detected). The thresholding feature(s) can help to conserve power, which may be particularly beneficial in cases where the personal audio device 10 relies upon battery power during use. In some cases, movement thresholds are predefined for the personal audio device 10, and saved, for example in the control circuit 30 and/or the settings library 260. In other cases, these thresholds can be user defined, and can be saved in the profile system 300.

In some cases, the orientation data from the sensor system 36 can indicate a number of acoustic signal sources (e.g., acoustic signal sources 530, FIG. 7) proximate the user 225, and/or a range of movement of the user 225 while wearing the personal audio device 10. For example, the conversation assistance audio engine 210 can be configured to detect user movement from a first position (A) to a second position (B), and also detect movement from the second positon (B) to a third position (C) and/or back to the first position (A). In the instance where a user 225 is conversing with a group of people (e.g., acoustic signal sources 530A-C), the user 225 is likely to turn and pause while looking at different speakers in the group. The conversation assistance audio engine 210 can catalog this orientation data (e.g., by time-stamping data entries, counting timeouts on feedback about movement between positions, or saving signal data about strong signals with speech-like modulation spectrum) to determine how many times a user 225 pauses proximate a particular location/orientation within a period. This data can be used to define a set of pause locations ($Lp_1$, $Lp_2$, $Lp_3$), which the conversation assistance audio engine 210 can associate with a number of acoustic signal sources 230 in the area proximate the user 225. This data can be further correlated with acoustic signals received at the microphone array to verify a number of acoustic signal sources 230 proximate the user 225, and/or a number of acoustic signal sources 230 that are of interest to the user 225. Detecting acoustic signal sources 230 (i.e., talkers) and building confidence in source identification can also be performed using, e.g., speech modulation index, strength of signal, time that the user 225 is positioned toward the acoustic signal source(s) 230. For example, the orientation data can be used to sort desired acoustic signal sources 230 from undesired acoustic signal sources 230. In certain cases, the user 225 can down-select desired versus undesired acoustic signal sources 230 using one or more interface commands described herein (e.g., with a user interface on the personal audio device 10 or another connected smart device). Examples can include verifying a desired acoustic signal source 230 using a first command (e.g., double-tap touch interface on personal audio device 10) and verifying an undesired acoustic signal source 230 using a second, distinct command (e.g., single-tap or swipe touch interface on personal audio device 10).

This orientation data can also be used to indicate a range of movement ($R_m$) of the user 225 while wearing the personal audio device 10. The sensor system 36 can receive orientation data indicating that the user 225 only moves his/her head a certain number of degrees (e.g., across a range of 120 degrees) over a period, and has limited his/her range of movement ($R_m$). In one example, a user 225 is seated, and has a limited range of movement without craning his/her neck or standing up. The conversation assistance audio engine 210 can detect this limited range of movement ($R_m$), and narrow the range of the microphone array's focus to correspond with this range of movement.

In still other implementations, the visual focus direction of the user 225 can be detected using eye tracking data about the movement of one or more of the user's eyes, for example, as received from a visual detection system in the sensor system 36. In the case that the personal audio device 10 and/or the smart device 280 is a head-worn device with a visual detection system such as an optical eye tracking system, the personal audio device 10 can detect movement of the user's eye(s) and adjust the directionality of the microphone array to focus on a direction in which the user is looking at a given time.

In additional implementations, the personal audio device 10 and/or the smart device 280 can include a visual detection system such as an optical tracking system that is configured to send visual tracking data about detected movement in an area proximate the user 225 and/or a range of movement ($R_m$) of the user 225 (while wearing the personal audio device 10). In some cases, the optical tracking system detects movement (shown in phantom, with one of the acoustic signal sources 530D) within a field of view relative to the user 225 (e.g., 180 degrees relative to the front of the personal audio device 10) and sends corresponding visual tracking data to the conversation assistance audio engine 210. In additional cases, the optical tracking system detects the user's movements within a given reference area to determine his/her range of movement. For example, the user may turn his/her head a certain number of degrees, or step forward, backward or side-to-side a certain number of steps within a given period. The optical tracking system can provide this visual tracking data to the conversation assistance audio engine 210 in order to calculate a microphone array focus range for this environment. The visual tracking data can indicate the presence of a human speaker proximate the user 225, the range of the user's movement and the relative movement of other possible acoustic signal sources with respect to the user 225. The conversation assistance audio engine 210 can use the visual tracking data to adjust a range of focus on the microphone array, as well as adjust a direction of focus on the microphone array. In some example implementations, the optical tracking system can be passive (e.g., a camera with human user and/or face detect), however, in other cases, the optical tracking system can be active (e.g., an IR emitter with a receiver capable of identifying the range and/or angle of nearby objects).

Figure 8:
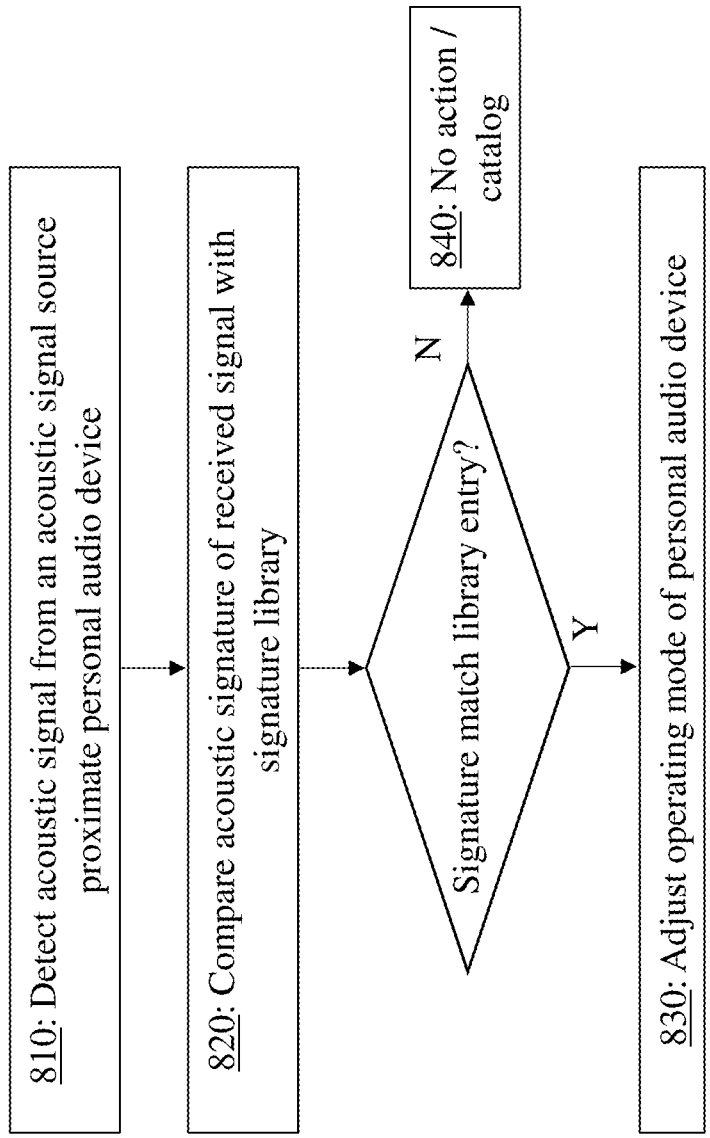
FIG. 8 is a process flow diagram illustrating processes performed by the conversation assistance audio engine shown in FIG. 4.

In still further implementations, the conversation assistance audio engine 210 is configured to adjust the operating mode of the personal audio device 10 based upon detected acoustic signatures. FIG. 8 is schematic flow diagram illustrating control processes performed by the conversation assistance audio engine 210 to adjust the operating mode of the personal audio device 10. FIG. 9 illustrates a user 225 in an environment 900 in order to demonstrate some of the functions described with respect to FIG. 8. FIG. 8 and FIG. 9 are referred to simultaneously.

In various implementations conversation assistance audio engine 210 can be configured to detect an acoustic signal 910 from an acoustic signal source(s) 530E, 530F, 530G proximate the personal audio device 10, using microphone(s) in the personal audio device 10 and/or the sensor system 36 (process 810, FIG. 8). In particular cases, the detected acoustic signal 910 has an acoustic signature that indicates a characteristic of the source 530. For example, the acoustic signature of the detected acoustic signal 910 can indicate the source 530 of the detected acoustic signal is a voice of the user 225, a voice of another user, a notification system or an alert system. In certain cases, the conversation assistance audio engine 210 can include a voice recognition circuit for detecting the user's voice and/or differentiating the user's voice from another user's voice.

In some cases, the conversation assistance audio engine 210 can compare the acoustic signature of the detected acoustic signal 910 with stored audio files 250 in an audio library 240 (FIG. 4) to detect the characteristic(s) of the source 530 (process 820, FIG. 8). For example, the stored audio files 250 can include data about acoustic signatures of common notifications or alerts (e.g., tonality, sound pressure levels, spectrum, modulation index). In some cases, notifications can include non-urgent reminders or indicators of particular events, for example, calendar notifications, email notifications or message notifications. Additionally, notifications can include keyword recognition (e.g., the user's name, greetings such as "hello" or "hi", etc.). In some cases, notification samples can be source characteristics alone, and not necessarily audio samples. Alerts can include more urgent information such as sirens, alarms, high-pitched sounds or spoken keyword recognition (e.g., "watch out!" or "help!"). Additionally, a machine learning engine, as described herein, can be used to detect characteristics of the source 530 and can be trained and refined to filter detected acoustic signals 910 over time.

In various implementations, in response to the acoustic signature of the detected acoustic signal 910 matching an acoustic signature in the audio library 240, the conversation assistance audio engine 210 can adjust an operating mode of the personal audio device 10 (process 830, FIG. 8). For example, the personal audio device 10 can have a plurality of operating modes, such as a playback mode, a focused listening mode, and a general listening mode. Situationally dependent operating modes can also be used, for example, "TV mode", "restaurant mode", "1:1 conversation mode", "quiet mode", etc. The playback mode can include ANR and/or CNC functionality to reduce the impact of ambient acoustic signals while the user 225 listens to audio playback on the personal audio device 10. For example, playback mode can be desirable when the user 225 is listening to music, a podcast or on a phone call using the personal audio device 10. Focused listening mode can use microphone array directionality to focus on one or more areas proximate the user 225 (e.g., based upon acoustic signal sources, as described herein). The user 225 can activate focused listening mode, or it can be activated by the conversation assistance audio engine 210 based upon sensor inputs (e.g., from sensor system 36). Focused listening mode may employ selective ANR and/or CNC functionality. Various examples of focused listening are described herein. General listening mode can essentially permit the user 225 to hear all ambient acoustic signals at approximately their naked-ear decibel level. That is, the general listening mode allows the user 225 to hear unobstructed acoustic signals from the environment. In some particular cases, the general listening mode increases the audibility of the acoustic signals based upon the user's level of hearing impairment, e.g., in order to provide audio playback at the personal audio device 10 at the same level as the received acoustic signals at the outer microphones.

In the case that the acoustic signature does not match a signature in the audio library 240, the conversation assistance audio engine 210 can maintain the current settings on the personal audio device 10 (e.g., take no additional action) and/or save the acoustic signature in the audio library 240 for use in analyzing future acoustic signals received at the microphone(s). This is illustrated in process 840 in FIG. 8.

In various implementations, switching between these operating modes can enhance the user experience and improve safety. For example, the conversation assistance audio engine 210 can detect an acoustic signal 910 that has a signature matching a police siren or a fire engine while the user 225 is in playback mode (e.g., with ANR and/or CNC engaged), and can adjust the operating mode to general listening mode or focused listening mode (focusing on the signal source) to enhance the user's awareness of this alert. In other examples, the conversation assistance audio engine 210 can switch from a general listening mode or a playback mode to a focused listening mode in response to detecting an acoustic signal 910 that has a signature matching a nearby human speaker (e.g., someone attempting to speak with the user 225). In these cases, as described herein, adjusting between operating modes can include modifying a directionality of the microphone array at the personal audio device 10.

As described herein, the conversation assistance audio engine 210 is configured to adjust the directionality of one or more microphone arrays according to user inputs (e.g., via interface(s)) and/or sensor data about the environment proximate the personal audio device. In some cases, creating the set of microphone array filters includes categorizing acoustic source samples according to at least one of frequency or amplitude, and correlating control instructions for modifying a gain on the microphone array with the categorized acoustic source samples. For example, microphone array filters can include frequency-dependent filters selected to knock out (interfere with) frequencies along a particular spectrum for one or more noise sources. Microphone array filters can be stored in a library as described herein, and can be accessed by the conversation assistance audio engine 210. In various implementations, the microphone array library can include a relational database including relationships between the microphone array filter(s) and a set of acoustic source samples. In some cases, this library can also include a text index for acoustic sound sources, e.g., with pre-set or user-definable categories. This could allow the user 225 (e.g., in response to a prompt) to provide information about the type of acoustic sound source (e.g., a noise source), such as by selecting a type of the source from a menu (e.g., provided in an interface at the personal audio device 10 and/or smart device 280), or by a spoken annotation transcribed using a speech-to-text algorithm (e.g., in the personal audio device 10 and/or smart device 280). The conversation assistance audio engine 210 can further include a learning engine (e.g., an artificial intelligence component such as an artificial neural network) configured to learn about the type of source selected, e.g., from a group of users' acoustic sound sources (e.g., alarms, notifications).

With reference to FIG. 4, one or more of the logic components described herein can include an artificial intelligence (AI) component for iteratively refining logic operations to enhance the accuracy of its results. Example AI components can include machine learning logic, a neural network including an artificial neural network, a natural language processing engine, a deep learning engine, etc. Logic components described herein (e.g., UI input logic 310, settings lookup/adjustment logic 320 and/or sensor data processing logic 330) may be interconnected in such a manner that these components act in concert or in reliance upon one another.

In some cases, the UI input logic 310 is configured to process a command or request from the user 225 from one or more interfaces and categorize that command or request in terms of a settings adjustment for the personal audio device 10. For example, the UI input logic 310 can be configured to translate the user commands and/or requests made via one or more interfaces into a value adjustment for the corresponding audio settings 270. This value adjustment is sent to the settings lookup/adjustment logic 320 for determining a corresponding settings adjustment based upon the user feedback. The UI input logic 310 can be configured to translate the adjustment within the interface configuration into an adjustment value for one or more settings on the personal audio device 10. That is, the adjustment within the interface configuration may involve a manageable number of variables for the user 225, but the audio settings 270 can include a variety of potential adjustments to meet the desired audio output of the user 225 at the personal audio device 10. In this sense, the UI input logic 310 translates the adjustment to the variables in the interface with adjustment values to audio settings on the personal audio device 10, e.g., a directivity of a microphone array, a microphone array filter, a volume of audio provided to the user, parameters controlling wide dynamic range compression or gain parameters controlling the shape of the frequency versus gain function. In some cases, these translations are made using a relational database or indexed data structure. Similarly, the sensor data processing logic 330 can process sensor data received from the sensor system 36 and interact with the settings lookup/adjustment logic 320 to modify microphone array direction and/or other audio settings, e.g., based upon data about user location, orientation, relationship with acoustic sound sources, profile information, etc.

The conversation assistance audio engine 210 is described in some examples as including logic for performing one or more functions. In various implementations, the logic in conversation assistance audio engine 210 can be continually updated based upon data received from the user 225 (e.g., user selections or commands), sensor data received from the sensor system 36, settings updates (in settings library 260), updates and/or additions to the audio library 240 and/or updates to user profile(s) 290 in the profile system 300.

In some example implementations, conversation assistance audio engine 210 (e.g., using UI input logic 310, settings lookup/adjustment logic 320 and/or sensor data processing logic 330) is configured to perform one or more of the following logic processes using sensor data, command data and/or other data accessible via profile system 300, smart device 280, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, conversation assistance audio engine 210 is configured to work in concert with sensor system 36 to continually monitor changes in one or more environmental conditions. In some cases, sensor system 36 may be set in an active mode, such as where a position tracking system pings nearby Wi-Fi networks to triangulate location of the personal audio device 10, or a microphone (e.g., microphones 18 and/or 24) remains in a "listen" mode for particular ambient sounds. In other implementations, sensor system 36 and conversation assistance audio engine 210 can be configured in a passive mode, such as where a wireless transceiver detects signals transmitted from nearby transceiver devices or network devices. In still other implementations, distinct sensors in the sensor system 36 can be set in distinct modes for detecting changes in environmental conditions and transmitting updated sensor data to conversation assistance audio engine 210. For example, some sensors in sensor system 36 can remain in an active mode while audio device 10 is active (e.g., powered on), while other sensors may remain in a passive mode for triggering by an event.

As described herein, user prompts can include an audio prompt provided at the audio device 10 or a distinct device (e.g., smart device 280), and/or a visual prompt or tactile/haptic prompt provided at the audio device 10 or a distinct device (e.g., smart device 280). In some cases, an audio prompt can include a phrase such as, "Would you like to adjust settings on your conversation assistance device?," or "Respond with a nod or "yes" to adjust audio settings," or, "Take action X to initiate adjustment mode." These are merely examples of audio prompts, and any suitable audio prompt could be used to elicit actuation by the user 225. In other cases, a visual prompt can be provided, e.g., on a smart device 280 or at the audio device 10 (e.g., at a user interface) which indicates that one or more operating modes or modifications are available. The visual prompt could include an actuatable button, a text message, a symbol, highlighting/lowlighting, or any other visual indicator capable of display on the audio device 10 and/or the smart device 280. A tactile/haptic prompt can include, e.g., a vibration or change in texture or surface roughness, and can be presented at the audio device 10 and/or smart device 280. This tactile/haptic prompt could be specific to the conversation assistance audio engine 210, such that the tactile/haptic prompt is a signature which indicates the operating mode (e.g., personalization mode) or adjustment (e.g., single-command adjustment) is available. As the tactile/haptic prompt may provide less information about the underlying content offered, distinct tactile/haptic prompts could be used to reflect priority, e.g., based upon user profile(s) 290 or other settings.

In some particular implementations, actuation of a prompt can be detectable by the audio device 10, and can include a gesture, tactile actuation and/or voice actuation by user 225. For example, user 225 can initiate a head nod or shake to indicate a "yes" or "no" response to a prompt, which is detected using a head tracker in the sensor system 36. In additional implementations, the user 225 can tap a specific surface (e.g., a capacitive touch interface) on the audio device 10 to actuate a prompt, or can tap or otherwise contact any surface of the audio device 10 to initiate a tactile actuation (e.g., via detectable vibration or movement at sensor system 36). In still other implementations, user 225 can speak into a microphone at audio device 10 to actuate a prompt and initiate the adjustment functions described herein.

In some other implementations, actuation of prompt(s) is detectable by the smart device 280, such as by a touch screen, vibrations sensor, microphone or other sensor on the smart device 280. In certain cases, the prompt can be actuated on the audio device 10 and/or the smart device 280, regardless of the source of the prompt. In other implementations, the prompt is only actuatable on the device from which it is presented. Actuation on the smart device 280 can be performed in a similar manner as described with respect to audio device 10, or can be performed in a manner specific to the smart device 280.

The adjustment processes described according to various implementations can significantly improve the user experience when compared with conventional approaches, for example, by closely tailoring the audio settings on the personal audio device 10 to user preferences and environmental conditions. The adjustment processes described according to various implementations can ease user interaction and adoption of the personal audio device 10 in real-world settings (e.g., in active conversation), and improve conversation assistance functions during use. Additionally, certain implementations allow the user to change audio settings with intuitive commands, streamlining the process of adjusting settings. Because the conversation assistance audio device (personal audio device 10) is often used in a public setting, users can appreciate the discreet nature of interface-based adjustments to the audio settings. These benefits are also realized in the sensor-based adjustments to audio settings, which can be performed without the user's direct interface actuation.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling a conversation-assistance audio device worn by a user, the method comprising:
   providing an interface connected with the conversation-assistance audio device, the interface comprising a visual representation of a spatial arrangement of the conversation-assistance audio device in an environment,
   wherein the interface is located on a screen on a computing device that is connected with the conversation-assistance audio device;
   receiving a user command at the interface to modify an audio output at the conversation-assistance audio device; and
   adjusting a directionality of a microphone array located on the conversation-assistance audio device based upon the user command received at the interface, wherein adjusting the directionality of the microphone array comprises adjusting a main lobe angle of the microphone array,
   wherein the user command comprises rotating or translating the computing device, and in response to rotation or translation of the computing device, the directionality of the microphone array on the conversation-assistance audio device is adjusted to correspond with a direction in which the computing device is pointing,
   wherein the visual representation of the spatial arrangement of the conversation-assistance audio device in the environment comprises a visual representation of acoustic signal sources proximate the conversation-assistance audio device, wherein the acoustic signal sources exclude acoustic signals originating from the conversation-assistance audio device and the computing device, and
   wherein the acoustic signal sources are detected by the microphone array and are visually represented on the screen in locations corresponding with a direction from which the acoustic signal sources are detected by the microphone array.

2. The computer-implemented method of claim 1, wherein the interface comprises a tactile interface, and wherein the user command received at the interface comprises a tactile command.

3. The computer-implemented method of claim 1, wherein the interface is located on the conversation-assistance audio device.

4. The computer-implemented method of claim 1, wherein the user command comprises a focus command or a null command, and wherein adjusting the directionality of the microphone array comprises modifying a gain on the microphone array based upon the focus command or the null command.

5. The computer-implemented method of claim 1, further comprising:
   receiving data indicating a direction in which the user is visually focused while wearing the conversation-assistance audio device; and
   adjusting the directionality of the microphone array on the conversation-assistance audio device to enhance acoustic signals received from the direction in which the user is visually focused based upon the received data about the direction in which the user is visually focused and the user command received at the interface.

6. The computer-implemented method of claim 5, wherein the data indicating the direction in which the user is visually focused comprises orientation data received from a motion detection system on the conversation-assistance audio device.

7. The computer-implemented method of claim 6, wherein the motion detection system comprises at least one of: an inertial measurement unit (IMU), an accelerometer or a gyroscope.

8. The computer-implemented method of claim 6, wherein the orientation data indicates at least one of: a number of sources of acoustic signals proximate the user, or a range of movement of the user while wearing the conversation-assistance audio device, and wherein the visual representation of the acoustic signal sources proximate the conversation-assistance audio device is updated based on a change in the direction in which the user is visually focused.

9. The computer-implemented method of claim 5, wherein the data indicating the direction in which the user is visually focused comprises eye tracking data about movement of the eyes of the user received from a visual detection system on the conversation-assistance audio device.

10. The computer-implemented method of claim 5, wherein the data indicating the direction in which the user is visually focused comprises at least one of visual tracking data about detected movement in an area proximate the user or visual tracking data about a range of movement of the user while wearing the conversation-assistance audio device.

11. The computer-implemented method of claim 1, further comprising:
   narrowing or widening a focus range of the microphone array in response to receiving a user command at the interface to modify the focus range of the microphone array.

12. The computer-implemented method of claim 11, wherein the user command to modify the focus range of the microphone array comprises a touch-and-drag command or a grab-and-rotate command on the screen.

13. The computer-implemented method of claim 1, further comprising modifying a gain on the microphone array to block acoustic signals from an area proximate the user in response to receiving a null command at the interface.

14. A computer-implemented method of controlling a conversation-assistance audio device worn by a user, the method comprising:
- providing an interface connected with the conversation-assistance audio device, the interface comprising a visual representation of a spatial arrangement of the conversation-assistance audio device in an environment,
- wherein the interface is located on a screen on a computing device that is connected with the conversation-assistance audio device;
- receiving a user command to modify an audio output at the conversation-assistance audio device; and
- adjusting a directionality of a microphone array located on the conversation-assistance audio device based upon the user command, wherein adjusting the directionality of the microphone array comprises adjusting a main lobe angle of the microphone array,
- wherein the user command comprises rotating or translating the computing device, and in response to rotation or translation of the computing device, the directionality of the microphone array on the conversation-assistance audio device is adjusted to correspond with a direction in which the computing device is pointing,
- wherein the visual representation of the spatial arrangement of the conversation-assistance audio device in the environment comprises a visual representation of acoustic signal sources proximate the conversation-assistance audio device, wherein the visual representation of the spatial arrangement of the conversation-assistance audio device in the environment comprises a visual representation of a space proximate the conversation-assistance audio device, wherein the acoustic signal sources exclude acoustic signals originating from the conversation-assistance audio device and the computing device, and
- wherein the acoustic signal sources are detected by the microphone array and are visually represented on the screen in locations corresponding with a direction from which the acoustic signal sources are detected by the microphone array.

15. The computer-implemented method of claim 14, further comprising:
- narrowing or widening a focus range of the microphone array in response to receiving a user command at the interface to modify the focus range of the microphone array.

16. A computer-implemented method of controlling a conversation-assistance audio device worn by a user, the method comprising:
- providing an interface connected with the conversation-assistance audio device, the interface comprising a visual representation of a spatial arrangement of the conversation-assistance audio device in an environment,
- wherein the interface is located on a screen on a computing device that is connected with the conversation-assistance audio device;
- receiving a user command at the interface to modify an audio output at the conversation-assistance audio device; and
- adjusting a directionality of a microphone array located on the conversation-assistance audio device based upon the user command received at the interface, wherein adjusting the directionality of the microphone array comprises adjusting a main lobe angle of the microphone array,
- wherein the user command comprises rotating or translating the computing device, and in response to rotation or translation of the computing device, the directionality of the microphone array on the conversation-assistance audio device is adjusted to correspond with a direction in which the computing device is pointing,
- wherein the visual representation of the spatial arrangement of the conversation-assistance audio device in the environment comprises a visual representation of acoustic signal sources proximate the conversation-assistance audio device, wherein the acoustic signal sources exclude acoustic signals originating from the conversation-assistance audio device and the computing device,
- wherein the acoustic signal sources are detected by the microphone array and are visually represented on the screen in locations corresponding with a direction from which the acoustic signal sources are detected by the microphone array, and
- wherein the directionality of the microphone array on the conversation-assistance audio device is further adjusted in response to selection of at least one of the acoustic signal sources or selection of a direction of at least one of the acoustic signal sources relative to the conversation-assistance audio device on the interface.

17. The computer-implemented method of claim 16, further comprising modifying a gain on the microphone array to block acoustic signals from an area proximate the user in response to receiving a null command at the interface.

* * * * *